US009998586B2

(12) United States Patent
Yuan et al.

(10) Patent No.: US 9,998,586 B2
(45) Date of Patent: Jun. 12, 2018

(54) METHOD, DEVICE AND STORAGE MEDIUM FOR SETTING POSITION OF FUNCTION SETTING KEY OF MOBILE TERMINAL

(71) Applicant: Tencent Technology (Shenzhen) Co., Ltd., Shenzhen, Guangdong (CN)

(72) Inventors: Cancai Yuan, Guangdong (CN); Lei Long, Guangdong (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 24 days.

(21) Appl. No.: 14/807,513

(22) Filed: Jul. 23, 2015

(65) Prior Publication Data

US 2015/0334223 A1    Nov. 19, 2015

Related U.S. Application Data

(63) Continuation of application No. PCT/CN2013/087946, filed on Nov. 27, 2013.

(30) Foreign Application Priority Data

Feb. 7, 2013 (CN) .......................... 2013 1 0049640

(51) Int. Cl.
*H04M 3/42* (2006.01)
*H04M 1/725* (2006.01)
(Continued)

(52) U.S. Cl.
CPC ..... *H04M 1/72563* (2013.01); *H04M 1/7258* (2013.01); *H04W 68/00* (2013.01); *G06F 3/048* (2013.01)

(58) Field of Classification Search
CPC . H04M 1/7258; H04M 1/72583; G06F 3/048; G06F 3/0486; G06F 3/0481;
(Continued)

(56) References Cited

U.S. PATENT DOCUMENTS 6,636,250 B1 * 10/2003 Gasser ................. G06F 3/0481
715/733
9,141,272 B1 * 9/2015 Cleron ................. G06F 1/1633
(Continued)

FOREIGN PATENT DOCUMENTS

| CN | 101957711 A | 1/2011 |
| CN | 102065178 A | 5/2011 |

(Continued)

OTHER PUBLICATIONS

Office Action dated Dec. 9, 2014 for corresponding Chinese Application No. 201310049640.7, 9 pages.
(Continued)

*Primary Examiner* — Dai A Phuong
(74) *Attorney, Agent, or Firm* — Morgan, Lewis & Bockius LLP (57) ABSTRACT

Described are a method, a device and a storage medium for setting a position of a function setting key of a mobile terminal, belonging to the computer field. The method includes obtaining display information and trigger event information of a function setting key of a target application, and setting each function setting key in a page of a notification center. When an order for opening the notification center is received, the method further includes displaying each function setting key in the page of the notification center, according to the display information of each function setting key. When it is detected that an operation to the function setting key displayed in the page of the notification center matches a trigger operation recorded in the trigger
(Continued)

event information of the function setting key, the method may perform the corresponding processing procedure, according to the trigger event information of the function setting key.

15 Claims, 4 Drawing Sheets

(51) Int. Cl.
*H04W 68/00* (2009.01)
*G06F 3/048* (2013.01)

(58) Field of Classification Search
CPC ............. G06F 3/04812; G06F 3/04815; G06F 3/04817; G06F 3/0482; G06F 3/0483; G06F 3/0484; G06F 3/04842
USPC ...... 455/457, 566, 567, 569.1; 715/706–711, 715/828–833, 847
See application file for complete search history.

(56) References Cited

U.S. PATENT DOCUMENTS

| | | | |
|---|---|---|---|
| 2006/0112354 A1* | 5/2006 | Park | G06F 3/0481 715/835 |
| 2007/0155369 A1* | 7/2007 | Jobs | G06F 3/0233 455/414.1 |
| 2007/0213041 A1* | 9/2007 | Horie | G06F 3/04817 455/419 |
| 2009/0322498 A1* | 12/2009 | Yun | G06F 3/016 340/407.2 |
| 2010/0273510 A1* | 10/2010 | Herman | B60R 11/02 455/456.3 |
| 2012/0030628 A1* | 2/2012 | Lee | G06F 3/0486 715/835 |
| 2013/0035138 A1* | 2/2013 | Abbott | H04L 67/36 455/566 |
| 2013/0086522 A1* | 4/2013 | Shimazu | G06F 3/0488 715/810 |
| 2016/0042162 A1* | 2/2016 | Newell | G06F 21/31 726/19 |
| 2017/0060359 A1* | 3/2017 | Chaudhri | G06F 9/4443 |

FOREIGN PATENT DOCUMENTS

| | | |
|---|---|---|
| CN | 102081504 A | 6/2011 |
| CN | 102147732 A | 8/2011 |
| CN | 102624970 A | 8/2012 |
| CN | 102855051 A | 1/2013 |
| CN | 103353821 A | 10/2013 |
| CN | 103425410 A | 12/2013 |

OTHER PUBLICATIONS

Office Action dated Sep. 29, 2015 for corresponding Chinese Application No. 201310049640.7, 8 pages.
International Search Report received in PCT Application No. PCT/CN2013/087946 dated Feb. 27, 2014.

* cited by examiner

METHOD, DEVICE AND STORAGE MEDIUM FOR SETTING POSITION OF FUNCTION SETTING KEY OF MOBILE TERMINAL

RELATED APPLICATION

The present application is a continuation application of PCT/CN2013/087946, filed on Nov. 27, 2013, and titled "METHOD, DEVICE AND STORAGE MEDIUM FOR SETTING POSITION OF FUNCTION SETTING KEY OF MOBILE TERMINAL", which claims priority to Chinese Patent Application No. 201310049640.7, titled "METHOD AND DEVICE FOR SETTING POSITION OF FUNCTION SETTING KEY OF MOBILE TERMINAL", filed by Tencent Technology (Shenzhen) Company Limited on Feb. 7, 2013, which are both incorporated herein by reference in their entireties.

FIELD OF THE TECHNOLOGY

The present disclosure relates to the field of computers, and in particular, to a method and a device for setting a position of a function setting key of a mobile terminal, and a storage medium.

BACKGROUND OF THE DISCLOSURE

With rapid development of mobile terminal technologies, application programs installed on a mobile terminal can provide more abundant system setting functions, and more corresponding function setting items appear as well. For example, an application program such as a mobile phone manager includes setting items of various system functions, and a user can set a corresponding function in the application program.

In an application program, many functions are provided with corresponding function setting keys, which are used for rapidly setting corresponding system functions. By operating a function setting key, a user can trigger rapid setting for a corresponding function.

Function setting keys of various functions provided by an application program can be operated only after the application program is run. In addition, many function setting keys are set at a deeper position, and can be found only by means of multiple click operations, which affects efficiency of system function setting to some extent.

SUMMARY

Embodiments of the present invention provide a method and a device for setting a position of a function setting key of a mobile terminal, and a storage medium, so as to improve efficiency of system function setting. The technical solutions are as follows:

According to one aspect, a method for setting a position of a function setting key of a mobile terminal is provided, including:

acquiring display information and trigger event information of a function setting key in a target application program;

setting the function setting key onto a page of a notification center according to the acquired display information and trigger event information of the function setting key;

displaying, when receiving an instruction for opening the notification center, the function setting key on the page of the notification center according to the display information of the function setting key; and executing corresponding processing according to the trigger event information of the function setting key, when a detected operation on the function setting key displayed on the page of the notification center conforms to a trigger operation recorded in the trigger event information of the function setting key.

According to another aspect, a device for setting a position of a function setting key of a mobile terminal is provided, including at least one processor and a memory having processor-executable instructions stored therein, and the instructions when executed by the at least one processor, configure the device to:

acquire display information and trigger event information of a function setting key in a target application program;

set the function setting key onto a page of a notification center according to the acquired display information and trigger event information of the function setting key;

display, when receiving an instruction for opening the notification center, the function setting key on the page of the notification center according to the display information of the function setting key; and execute corresponding processing according to the trigger event information of the function setting key, when a detected operation on the function setting key displayed on the page of the notification center conforms to a trigger operation recorded in the trigger event information of the function setting key.

According to still another aspect, a non-transitory computer-readable storage medium including a computer executable instruction is provided, when executed by a computer processor, the computer executable instruction configures the mobile terminal to set a position of a function setting key, by performing:

acquiring display information and trigger event information of a function setting key in a target application program;

setting the function setting key onto a page of a notification center according to the acquired display information and trigger event information of the function setting key;

displaying, when receiving an instruction for opening the notification center, the function setting key on the page of the notification center according to the display information of the function setting key; and executing corresponding processing according to the trigger event information of the function setting key, when a detected operation on the function setting key displayed on the page of the notification center conforms to a trigger operation recorded in the trigger event information of the function setting key.

In the method and device for setting a position of a function setting key of a mobile terminal, and the storage medium that are provided by the embodiments of the present invention, display information and trigger event information of a function setting key in a target application program are acquired, and the corresponding function setting key is set onto a page of a notification center according to the acquired information; when the notification center is opened, the function setting key can be displayed on the page of the notification center, and the function setting key can be operated on the page of the notification center, so that a corresponding system function can be set in the notification center, thereby improving efficiency of system function setting.

BRIEF DESCRIPTION OF THE DRAWINGS

To describe the technical solutions in the embodiments of the present invention more clearly, the following briefly introduces the accompanying drawings required for describing the embodiments. Certainly, the accompanying drawings in the following description show only some embodiments of the present invention, and a person of ordinary skill in the art may still make modification and replacement on these accompanying drawings without creative work.

DESCRIPTION OF EMBODIMENTS

The following clearly and completely describes the technical solutions in the embodiments of the present invention with reference to accompanying drawings. Apparently, the described embodiments are a few embodiments of the present invention rather than all embodiments. These embodiments are merely used for describing the principle of the present disclosure, but are not intended to limit the scope of the present disclosure. All other embodiments obtained by a person of ordinary skill in the art based on the embodiments of the present invention without creative work shall fall within the protection scope of the present disclosure.

Embodiment 1

Figure 1:
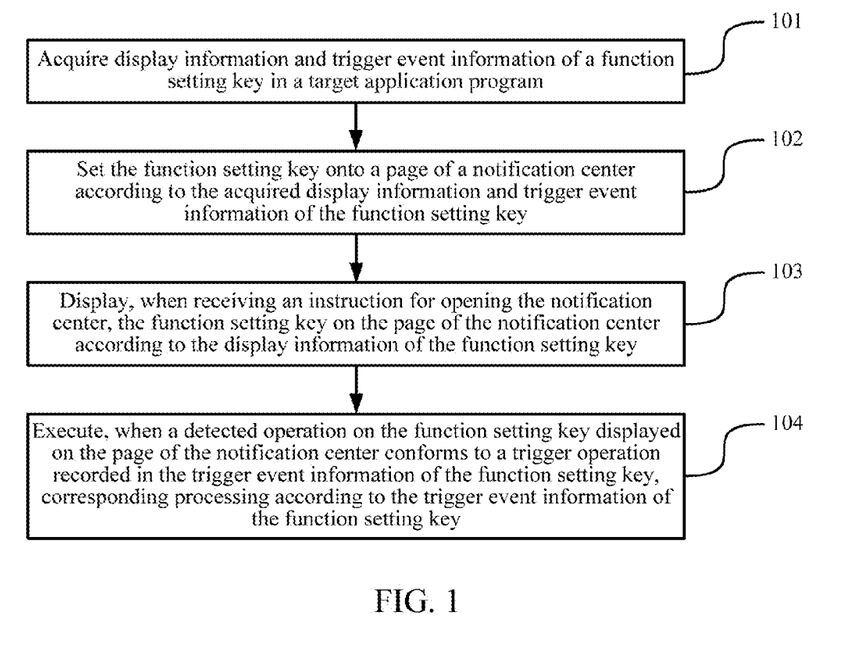
FIG. 1 illustrates a flowchart of a method for setting a position of a function setting key of a mobile terminal according to an embodiment of the present invention.

This embodiment of the present invention provides a method for setting a position of a function setting key of a mobile terminal. As shown in FIG. 1, a process of the method may include the following step 101 to step 104:

Step 101: Acquire display information and trigger event information of a function setting key in a target application program.

Step 102: Set the function setting key onto a page of a notification center according to the acquired display information and trigger event information of the function setting key.

Step 103: Display, when receiving an instruction for opening the notification center, the function setting key on the page of the notification center according to the display information of the function setting key.

Step 104: Execute, when a detected operation on the function setting key displayed on the page of the notification center conforms to a trigger operation recorded in the trigger event information of the function setting key, corresponding processing according to the trigger event information of the function setting key.

In this embodiment of the present invention, display information and trigger event information of a function setting key in a target application program are acquired, and the corresponding function setting key is set onto a page of a notification center according to the acquired information; when the notification center is opened, the function setting key may be displayed on the page of the notification center, and the function setting key can be operated on the page of the notification center, so that a corresponding system function can be set in the notification center, thereby improving efficiency of system function setting.

Embodiment 2

This embodiment of the present invention provides a method for setting a position of a function setting key of a mobile terminal. The method may be executed by a mobile terminal. Preferably, the method may be applied in the iOS (an operating system of a handheld mobile terminal developed by Apple Inc.). The following describes in detail an implementation process in conjunction with FIG. 1.

Step 101: Acquire display information and trigger event information of a function setting key in a target application program. The display information is data information used for rendering an icon of the function setting key. The trigger Fevent information is information used for defining a triggering manner of the function setting key and processing after triggering. The target application program may be an application program (for example, an application program such as a mobile phone manager) installed in a system, and one or more function setting keys are configured in the target application program.

As for the triggering manner, a function setting key in a left/right toggle control mode may be used, or a function setting key in a click control mode may also be used. For example, for a function item with only two choices, which are enable and disable, if a function setting key in a left/right toggle control mode is used, a corresponding function is enabled accordingly when the function setting key is switched to one side, and the corresponding function is disabled accordingly when the function setting key is switched to the other side; if a function setting key in a click control mode is used, a corresponding function is disabled when the function setting key is clicked in a function enabled state, and the corresponding function is enabled when the function setting key is clicked in a function disabled state. For another example, for a function item with a plurality of selectable tap positions, if a function setting key in a left/right toggle control mode is used, different positions where the key is switched respectively correspond to different tap positions of the function; if a function setting key in a click control mode is used, a switch between tap positions for the function is performed after each click on the function setting key. Preferably, a function setting key in a click control mode is used in this embodiment of the present invention.

In this step, display information and trigger event information corresponding to all function setting keys in the target application program may be acquired, or display information and trigger event information corresponding to some function setting keys in the target application program may be selected to be acquired.

Specifically, a selected function setting key may include one or more of the following function setting keys, that is, one or any combination of a brightness adjustment key, a lock screen key, a flashlight switch, a mute switch, a volume-up key, a volume-down key, a power-off key, a restart key, and a logout key. In addition to the function setting key in the target application program, display information and trigger event information corresponding to a function setting key in some system setting items may also be selected to be acquired, such as a Wireless Fidelity (WiFi) function key, a data function key, a locating function key, a Bluetooth function key, a flight mode switch, a 3rd Generation Telecommunication (3G) function key, and a rotation lock switch.

The brightness adjustment key is used for controlling, by detecting a click operation on the brightness adjustment key, screen brightness to switch between preset brightness levels. For example, the brightness is increased by one level after each click on the brightness adjustment key, and is switched to the lowest brightness level after a click on the brightness adjustment key at the highest brightness level; or, the brightness adjustment key is used for controlling, by detecting duration of a press operation on the brightness adjustment key, screen brightness to change with increase of duration. For example, the brightness may be gradually increased when the brightness adjustment key is pressed, and may be switched to the lowest level when the brightness adjustment key is pressed at the highest brightness level. The lock screen key is used for triggering screen lock of a mobile terminal after a click. The flashlight switch is used for controlling a photoflash to continuously glow (which may be used as a flashlight) or to be turned off. The mute switch is used for enabling and disabling a mute mode. The volume-up key is used for controlling the volume to increase, and the volume is increased by one level after each click on the key. The volume-down key is used for controlling the volume to reduce, and the volume is reduced by one level after each click on the key. The power-off key is used for triggering turning off a mobile terminal after a click. The restart key is used for triggering restart of a mobile terminal after a click. The logout key is used for triggering logout of a mobile terminal after a click.

The system may automatically set the function setting keys, whose display information and trigger event information are acquired, in the target application program. Specifically, function setting keys used more frequently are displayed in a window according to statistics on general use frequencies of various application programs.

In addition, preferably, an execution process of step 101 may include: receiving a key setting request, where the key setting request carries a function setting key identifier; and acquiring display information and trigger event information of a function setting key, corresponding to the function setting key identifier, in the target application program.

Specifically, each function setting key may be provided with a corresponding function setting key identifier, and a mobile terminal may store a function setting key identifier corresponding to each function setting key, and after receiving a key setting request, the mobile terminal may acquire display information and trigger event information of a function setting key corresponding to the function setting key identifier.

Step 102: Set the function setting key onto a page of a notification center according to the acquired display information and trigger event information of the function setting key. The notification center is a display window for system notification messages, and can be opened through triggering by a pull-down operation on a state bar at the top of the desktop. The notification center is generally used for displaying a notification message of a system or an application. For example, a short message service notification, a WeChat notification, a missed call notification, and the like.

Specifically, display information and trigger event information of each function setting key may be added to data of the page of the notification center, to re-generate and store a page of a notification center. Data of the re-generated page of the notification center includes data information used for rendering a function setting key, and information used for defining how to trigger a function setting key and perform processing after triggering.

Preferably, the key setting request may further carry sequence information corresponding to the function setting key identifier. Each function setting key identifier may correspond to one piece of sequence information. In this way, when the function setting key is set onto the page of the notification center, function setting keys on the page of the notification center are arranged according to the sequence information. The function setting keys may be arranged according to corresponding sequence information. The sequence information may be a sequence number, and the function setting keys may be arranged according to the sequence numbers.

In this embodiment of the present invention, a setting page (refer to FIG. 2) may be provided in the target application program. The setting page is used for setting a function setting key displayed on the page of the notification center. The setting page may display icons of all function setting keys in the target application program, or may also display icons of function setting keys in a system setting item of a mobile terminal (if the number is too large, display in pages may be adopted), and a check box for each icon may be set. When clicking an icon, a user checks an unchecked icon, or unchecks a checked icon. In this page, a checked icon may be automatically arranged in a front position, so that when performing a long-press on a checked icon, the user may drag the icon to a different position, thereby arranging the checked icon. In this way, after the user sets an application program, a corresponding function setting key identifier may be determined according to a checked icon, and corresponding sequence information may also be determined according to a sequence of the checked icon, so that a key setting request is generated according to the determined function setting key identifier and sequence information, and is sent to a processor to perform the foregoing processing.

Figure 2:
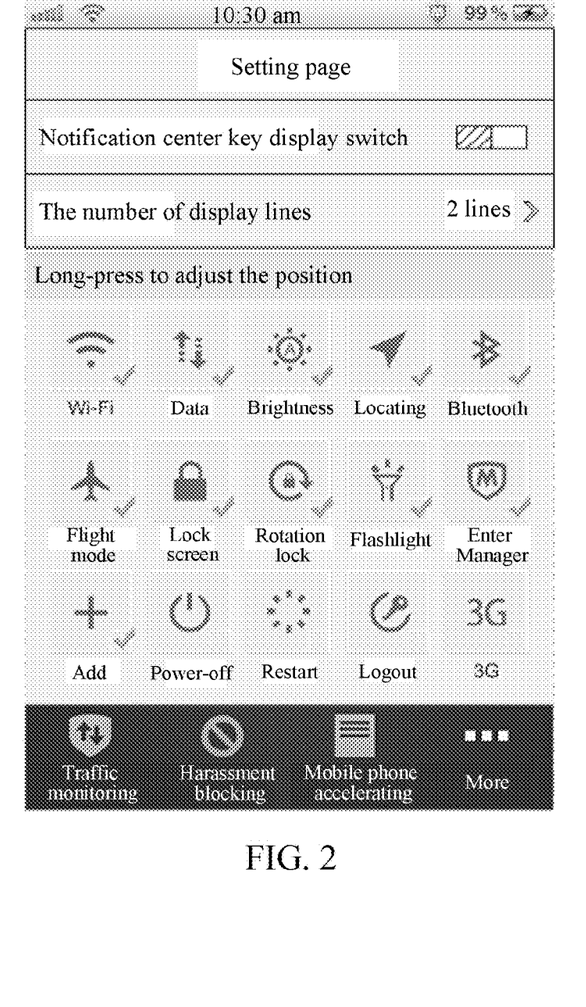
FIG. 2 illustrates a schematic diagram of a setting page according to an embodiment of the present invention.

In the setting page, a notification center key display switch may also be provided, so as to control display of enabling and disabling a function of a function setting key on the notification center. An option of the number of lines of displayed keys may also be set, so as to set the number of lines of function setting keys displayed on the page of the notification center.

Step 103: Display, when receiving an instruction for opening the notification center, the function setting key on the page of the notification center according to the display information of the function setting key.

The instruction for opening the notification center may be triggered by a pull-down operation on a state bar at the top of the desktop.

Figure 3A:
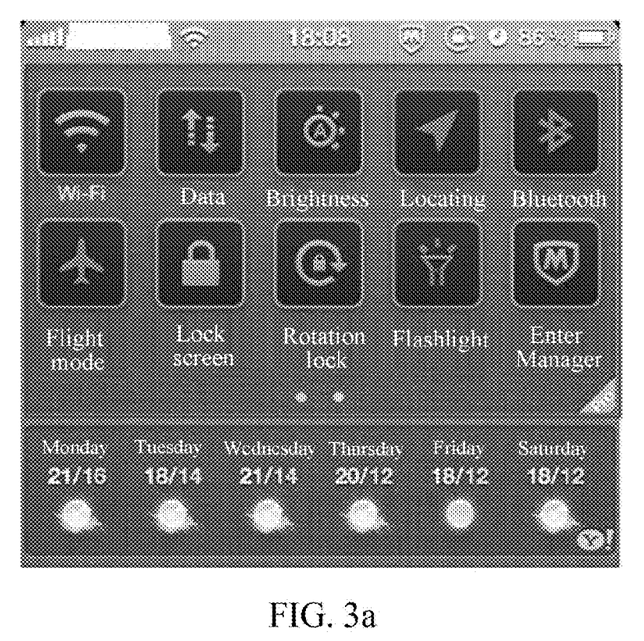
FIG. 3a and FIG. 3b illustrate schematic diagrams of a page of a notification center according to an embodiment of the present invention.
Figure 3B:
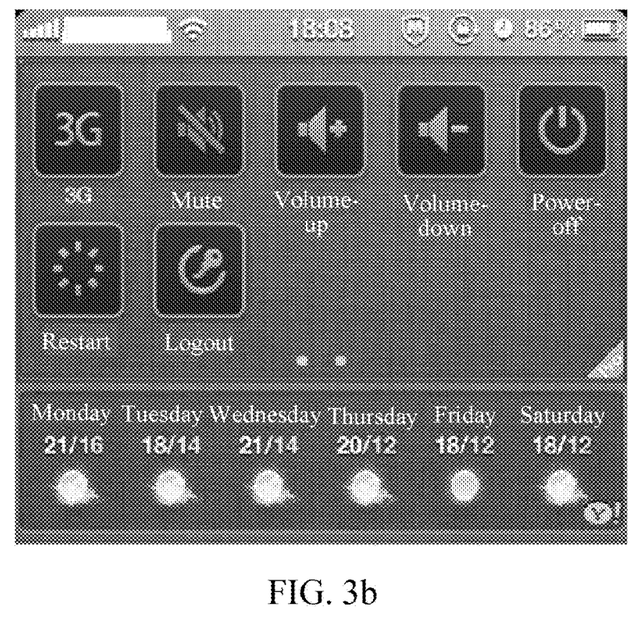

In this embodiment of the present invention, FIG. 3*a* and FIG. 3*b* illustrate a schematic diagram of display of a function setting key on the page of the notification center. When there are a large number of function setting keys, the function setting keys may be displayed in different pages. For example, FIG. 3*a* and FIG. 3*b* respectively illustrate a first page and a second page of the display in pages.

Step 104: Execute, when a detected operation on the function setting key displayed on the page of the notification center conforms to a trigger operation recorded in the trigger event information of the function setting key, corresponding processing according to the trigger event information of the function setting key.

Specifically, the trigger event information of the function setting key may record a trigger operation for triggering the function setting key (for example, a click operation on a function setting key), and also record processing executed after the function setting key is triggered. If a detected operation matches a recorded trigger operation, corresponding processing is executed.

In this embodiment of the present invention, a shortcut icon of an application program may also be set onto the page of the notification center. Specifically, display information and trigger event information of the shortcut icon of the application program may be acquired, and the shortcut icon is set onto the page of the notification center according to the acquired display information and trigger event information of the shortcut icon; when an instruction for opening the notification center is received, the shortcut icon is displayed on the page of the notification center according to the display information of the shortcut icon; and when a detected operation on a shortcut icon displayed on the page of the notification center conforms to a trigger operation recorded in the trigger event information of the shortcut icon, the application program corresponding to the shortcut icon is executed. A shortcut icon is a button for starting an application program. A corresponding application program may be started by using a shortcut icon. A shortcut icon of a frequently used application program provided in the notification center enables the shortcut icon of the frequently used application program to be conveniently and rapidly found.

In this embodiment of the present invention, display information and trigger event information of a function setting key in a target application program are acquired, and the corresponding function setting key is set onto a page of a notification center according to the acquired information; when the notification center is opened, the function setting key can be displayed on the page of the notification center, and the function setting key can be operated on the page of the notification center, so that a corresponding system function can be set in the notification center, thereby improving efficiency of system function setting.

Embodiment 3

Figure 4:
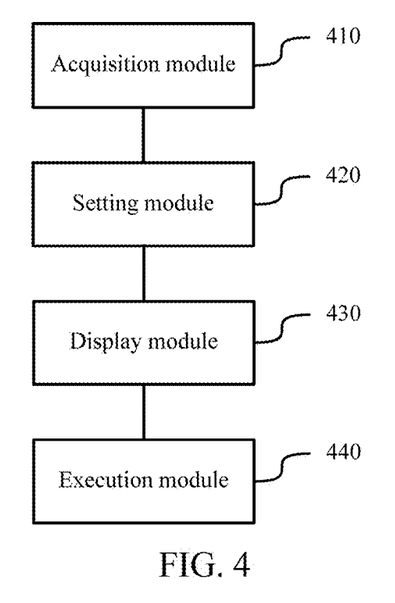
FIG. 4 illustrates a schematic structural diagram of a device for setting a position of a function setting key of a mobile terminal according to an embodiment of the present invention.

Based on the same technical concept, this embodiment of the present invention further provides a device for setting a position of a function setting key of a mobile terminal. The device may be configured to execute the methods provided in Embodiment 1 and Embodiment 2 for setting a position of a function setting key of a mobile terminal. As shown in FIG. 4, the device includes:

an acquisition module 410, configured to acquire display information and trigger event information of a function setting key in a target application program;

a setting module 420, configured to set the function setting key onto a page of a notification center according to the acquired display information and trigger event information of the function setting key;

a display module 430, configured to display, when receiving an instruction for opening the notification center, the function setting key on the page of the notification center according to the display information of the function setting key; and an execution module 440, configured to execute, when a detected operation on the function setting key displayed on the page of the notification center conforms to a trigger operation recorded in the trigger event information of the function setting key, corresponding processing according to the trigger event information of the function setting key.

The function setting key includes one or any combination of a brightness adjustment key, a lock screen key, a flashlight switch, a mute switch, a volume-up key, a volume-down key, a power-off key, a restart key, and a logout key.

Preferably, the brightness adjustment key is configured to:

control, by detecting a click operation on the brightness adjustment key, screen brightness to switch between preset brightness levels; or control, by detecting duration of a press operation on the brightness adjustment key, screen brightness to change with increase of the duration.

Preferably, the acquisition module 410 is specifically configured to:

receive a key setting request, where the key setting request carries a function setting key identifier; and acquire display information and trigger event information of a function setting key, corresponding to the function setting key identifier, in the target application program.

Preferably, the key setting request further carries sequence information corresponding to the function setting key identifier; and the setting module 420 is further configured to arrange the function setting key on the page of the notification center according to the sequence information.

Preferably, the acquisition module 410 is further configured to acquire display information and trigger event information of a shortcut icon of an application program;

the setting module 420 is further configured to set the shortcut icon onto the page of the notification center according to the acquired display information and trigger event information of the shortcut icon;

the display module 430 is further configured to display, when receiving an instruction for opening the notification center, the shortcut icon on the page of the notification center according to the display information of the shortcut icon; and the execution module 440 is further configured to execute, when a detected operation on the shortcut icon displayed on the page of the notification center conforms to a trigger operation recorded in the trigger event information of the shortcut icon, an application program corresponding to the shortcut icon.

In this embodiment of the present invention, display information and trigger event information of a function setting key in a target application program are acquired, and the corresponding function setting key is set onto a page of a notification center according to the acquired information; when the notification center is opened, the function setting key can be displayed on the page of the notification center, and the function setting key can be operated on the page of the notification center, so that a corresponding system function can be set in the notification center, thereby improving efficiency of system function setting.

It should be noted that the above functional modules are only described illustratively during a device for setting a position of a function setting key of a mobile terminal provided by the foregoing embodiment is displaying a function setting key. In practice, the functions may be allocated to different functional modules according as desired. That is, the internal structure of the device may be divided to different functional modules to accomplish all or some of the above described functions. In addition, the device for setting a position of a function setting key of a mobile terminal provided by the foregoing embodiment is based on the same concept as that of the methods for setting a position of a function setting key of a mobile terminal in the foregoing embodiments. Details may be referred to the method embodiments, and are not repeated herein.

Embodiment 4

This embodiment of the present invention provides a storage medium including computer executable instructions, when executed by a computer processor, the computer executable instructions being used for executing a method for setting a position of a function setting key of a mobile terminal, the method including:

acquiring display information and trigger event information of a function setting key in a target application program;

setting the function setting key onto a page of a notification center according to the acquired display information and trigger event information of the function setting key;

displaying, when receiving an instruction for opening the notification center, the function setting key on the page of the notification center according to the display information of the function setting key; and executing, when a detected operation on the function setting key displayed on the page of the notification center conforms to a trigger operation recorded in the trigger event information of the function setting key, corresponding processing according to the trigger event information of the function setting key.

Preferably, the method further includes:

acquiring display information and trigger event information of a shortcut icon of an application program;

setting the shortcut icon onto the page of the notification center according to the acquired display information and trigger event information of the shortcut icon;

displaying, when receiving an instruction for opening the notification center, the shortcut icon on the page of the notification center according to the display information of the shortcut icon; and executing, when a detected operation on the shortcut icon displayed on the page of the notification center conforms to a trigger operation recorded in the trigger event information of the shortcut icon, an application program corresponding to the shortcut icon.

The sequence numbers of the foregoing embodiments of the present invention are merely used for convenience of description, but do not indicate superiority of the embodiments.

Through the above description of the implementation manners, a person skilled in the art may clearly understand that, the present disclosure may be implemented by using software and necessary common hardware such as a processor or microcodes stored in a memory, and certainly may also be implemented by a combination of hardware and software. Although, in most cases, the former case using software is a preferred implementation manner. Based on such understanding, the essence of the technical solutions of the present invention or a part contributing to the existing technology may be reflected in the form of a software product. The computer software product may be stored in a non-transitory computer-readable storage medium, such as a floppy disk, a read-only memory (ROM), a random access memory (RAM), a flash memory (FLASH), a hard disk, or an optical disc of a computer. The computer software product includes several instructions that are used for enabling a computer device (which may be a personal computer, a server, a network device, or the like) to execute the method according to the embodiments of the present invention.

The above description is merely preferable embodiments of the present invention, and is not intended to limit the present disclosure. Any modification, equivalent replacement and improvement made within the spirit and principle of the present disclosure shall fall within the protection scope of the present disclosure.

What is claimed is:

1. A method for setting a position of a function setting key of a mobile terminal, comprising:

acquiring display information and trigger event information of a function setting key in a target application program;

setting the function setting key onto a page of a notification center according to the acquired display information and trigger event information of the function setting key;

displaying, when receiving an instruction for opening the notification center, the function setting key on the page of the notification center according to the display information of the function setting key; and executing corresponding processing according to the trigger event information of the function setting key, when a detected operation on the function setting key displayed on the page of the notification center conforms to a trigger operation recorded in the trigger event information of the function setting key;

wherein, a setting page is provided in the target application program to set the function setting key on the page of the notification center; the setting page displays icons of function setting keys and a check box for each icon that is set; a checked icon is automatically arranged in a front position of all function setting keys;

when performing a long-press on a checked icon, the icon is dragged to a different position; wherein a corresponding function setting key identifier is determined according to a checked icon, and corresponding sequence information is determined according to a sequence of the checked icon;

wherein the method further comprises:

receiving a key setting request, wherein the key setting request carries a function setting key identifier and sequence information corresponding to the function setting key identifier;

acquiring display information and trigger event information of a function setting key which corresponds to the function setting key identifier in the target application program; and arranging multiple function setting keys on the page of the notification center according to the sequence information.

2. The method according to claim 1, wherein the function setting key comprises one or any combination of: a brightness adjustment key, a lock screen key, a flashlight switch, a mute switch, a volume-up key, a volume-down key, a power-off key, a restart key, and a logout key.

3. The method according to claim 2, wherein the brightness adjustment key is configured to:

control, by detecting a click operation on the brightness adjustment key, screen brightness to switch between preset brightness levels.

4. The method according to claim 2, wherein the brightness adjustment key is configured to:

control, by detecting a duration of a press operation on the brightness adjustment key, screen brightness to change with an increase of the duration of the press operation.

5. The method according to claim 1, further comprising:

acquiring display information and trigger event information of a shortcut icon of an application program; and setting the shortcut icon onto the page of the notification center according to the acquired display information and trigger event information of the shortcut icon.

6. The method according to claim 5, further comprising:
displaying, when receiving an instruction for opening the notification center, the shortcut icon on the page of the notification center according to the display information of the shortcut icon; and
executing an application program corresponding to the shortcut icon, when a detected operation on the shortcut icon displayed on the page of the notification center conforms to a trigger operation recorded in the trigger event information of the shortcut icon.

7. A device for setting a position of a function setting key of a mobile terminal, comprising at least one processor and a memory having processor-executable instructions stored therein, and the instructions when executed by the at least one processor, configure the device to:
acquire display information and trigger event information of a function setting key in a target application program;
set the function setting key onto a page of a notification center according to the acquired display information and trigger event information of the function setting key;
display, when receiving an instruction for opening the notification center, the function setting key on the page of the notification center according to the display information of the function setting key; and
execute corresponding processing according to the trigger event information of the function setting key, when a detected operation on the function setting key displayed on the page of the notification center conforms to a trigger operation recorded in the trigger event information of the function setting key;
wherein, a setting page is provided in the target application program to set the function setting key on the page of the notification center; the setting page displays icons of function setting keys and a check box for each icon that is set; a checked icon is automatically arranged in a front position of all function setting keys;
when performing a long-press on a checked icon, the icon is dragged to a different position; a corresponding function setting key identifier is determined according to a checked icon, and corresponding sequence information is determined according to a sequence of the checked icon;
wherein the device is further configured to:
receive a key setting request, wherein the key setting request carries a function setting key identifier and sequence information corresponding to the function setting key identifier;
acquire display information and trigger event information of a function setting key, which corresponds to the function setting key identifier in the target application program; and
arrange function setting keys on the page of the notification center according to the sequence information.

8. The device according to claim 7, wherein the function setting key comprises one or any combination of a brightness adjustment key, a lock screen key, a flashlight switch, a mute switch, a volume-up key, a volume-down key, a power-off key, a restart key, and a logout key.

9. The device according to claim 8, wherein the brightness adjustment key is configured to:
control, by detecting a click operation on the brightness adjustment key, screen brightness to switch between preset brightness levels.

10. The device according to claim 8, wherein the brightness adjustment key is configured to:
control, by detecting a duration of a press operation on the brightness adjustment key, screen brightness to change with an increase of the duration of the press operation.

11. The device according to claim 7, wherein the device is further configured to acquire display information and trigger event information of a shortcut icon of an application program; and
the device is further configured to set the shortcut icon onto the page of the notification center according to the acquired display information and trigger event information of the shortcut icon.

12. The device according to claim 11, wherein:
the device is further configured to display, when receiving an instruction for opening the notification center, the shortcut icon on the page of the notification center according to the display information of the shortcut icon; and
the device is further configured to execute, when a detected operation on the shortcut icon displayed on the page of the notification center conforms to a trigger operation recorded in the trigger event information of the shortcut icon, an application program corresponding to the shortcut icon.

13. A non-transitory computer-readable storage medium comprising computer executable instructions, when executed by a computer processor, the computer executable instructions being used to configure a mobile terminal set a position of a function setting key, by performing:
acquiring display information and trigger event information of a function setting key in a target application program;
setting the function setting key onto a page of a notification center according to the acquired display information and trigger event information of the function setting key;
displaying, when receiving an instruction for opening the notification center, the function setting key on the page of the notification center according to the display information of the function setting key; and
executing corresponding processing according to the trigger event information of the function setting key, when a detected operation on the function setting key displayed on the page of the notification center conforms to a trigger operation recorded in the trigger event information of the function setting key;
wherein, a setting page is provided in the target application program to set the function setting key on the page of the notification center; the setting page displays icons of function setting keys and a check box for each icon that is set; a checked icon is automatically arranged in a front position of all function setting keys;
when performing a long-press on a checked icon, the icon is dragged to a different position; a corresponding function setting key identifier is determined according to a checked icon, and corresponding sequence information is determined according to a sequence of the checked icon;
wherein the computer executable instructions further perform:
receiving a key setting request, wherein the key setting request carries a function setting key identifier and sequence information corresponding to the function setting key identifier;
acquiring display information and trigger event information of a function setting key which corresponds to the function setting key identifier in the target application program; and arranging multiple function setting keys on the page of the notification center according to the sequence information.

14. The non-transitory computer-readable storage medium according to claim 13, wherein the method further comprising:
acquiring display information and trigger event information of a shortcut icon of an application program; and
setting the shortcut icon onto the page of the notification center according to the acquired display information and trigger event information of the shortcut icon.

15. The non-transitory computer-readable storage medium according to claim 14, wherein the method further comprising:
displaying, when receiving an instruction for opening the notification center, the shortcut icon on the page of the notification center according to the display information of the shortcut icon; and
executing an application program corresponding to the shortcut icon when a detected operation on the shortcut icon displayed on the page of the notification center conforms to a trigger operation recorded in the trigger event information of the shortcut icon.

\* \* \* \* \*